(12) United States Patent
Perry

(10) Patent No.: US 7,481,414 B2
(45) Date of Patent: Jan. 27, 2009

(54) NATURAL VACUUM LEAK DETECTION DEVICE WITH MAGNETIC DAMPING

(75) Inventor: Paul D. Perry, Chatham (CA)

(73) Assignee: Siemens Canada Limited, East Chatham Ontario (CA)

(*) Notice: Subject to any disclaimer, the term of this patent is extended or adjusted under 35 U.S.C. 154(b) by 85 days.

(21) Appl. No.: 11/797,136

(22) Filed: May 1, 2007

(65) Prior Publication Data

US 2007/0256671 A1 Nov. 8, 2007

Related U.S. Application Data

(60) Provisional application No. 60/746,524, filed on May 5, 2006.

(51) Int. Cl.
*F16K 31/06* (2006.01)
(52) U.S. Cl. .................................. 251/48; 123/516
(58) Field of Classification Search .................. 251/48, 251/129.15, 129.16, 129.17; 123/516
See application file for complete search history.

(56) References Cited

U.S. PATENT DOCUMENTS

| 5,029,807 | A | * | 7/1991 | Fuchs ........................ 251/65 |
| 5,632,361 | A | * | 5/1997 | Wulff et al. ................. 188/267 |
| 5,722,633 | A | * | 3/1998 | Goossens et al. ........ 251/129.15 |
| 5,727,769 | A | * | 3/1998 | Suzuki ................... 251/129.15 |
| 6,199,587 | B1 | * | 3/2001 | Shlomi et al. ............. 137/625.5 |
| 6,435,472 | B1 | * | 8/2002 | Najmolhoda et al. .......... 251/50 |
| 7,040,301 | B2 | | 5/2006 | Perry et al. |
| 7,121,267 | B2 | | 10/2006 | Perry et al. |
| 2002/0121187 | A1 | * | 9/2002 | Schluter ................... 91/376 R |

* cited by examiner

*Primary Examiner*—Thomas N Moulis

(57) ABSTRACT

A pressure management apparatus (10) includes a housing (30) defining a fluid communication passage between first and second fluid ports (46, 48). A poppet (40) is disposed in the housing and is movable between first and second positions. The first position prevents fluid communication between the first and second ports and the second position permits fluid communication between the first and second ports. The poppet includes a structure (75) translatable along an axis relative to the housing. At least a portion of the structure includes a permanent magnet (72). A member (78) is fixed with respect to the housing and is associated with the structure. At least a portion of the member is of ferrous material such that the magnet is attracted to the member so that at least a portion of the poppet frictionally engages the member to create a dashpot damping of resonance of the poppet in the second position.

20 Claims, 2 Drawing Sheets

NATURAL VACUUM LEAK DETECTION DEVICE WITH MAGNETIC DAMPING

This application claims the benefit of the earlier filing date of U.S. Provisional Application No. 60/746,524, filed on May 5, 2006, which is incorporated by reference herein in its entirety.

FIELD OF THE INVENTION

This invention relates to vapor management systems of vehicles and, more particularly, to an improved Natural Vacuum Leak Detector (NVLD) of the system.

BACKGROUND OF THE INVENTION

A known fuel system for vehicles with internal combustion engines includes a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the U.S. Environmental Protection Agency and the Air Resources Board of the California Environmental Protection Agency, have promulgated standards related to limiting fuel vapor releases into the atmosphere. Thus, it is believed that there is a need to avoid releasing fuel vapors into the atmosphere, and to provide an apparatus and a method for performing a leak diagnostic, so as to comply with these standards.

An automotive leak detection on-board diagnostic (OBD) determines if there is a leak in the vapor management system of an automobile. The vapor management system can include the fuel tank headspace, the canister that collects volatile fuel vapors from the headspace, a purge valve and all associated hoses. A pressure/vacuum sensor or switch allows the engine computer to monitor the vacuum that is caused by the system cooling after the engine has been turned off and thereby performs the leak detection diagnostic. A vacuum relief function provides fail-safe operation of the purge flow system and guarantees that vacuum levels in the fuel tank do not endanger the integrity of the tank both with the engine on and off.

A pressure relief function is desired in order to "blow off" any excessive fuel vapor immediately after engine shutdown and to facilitate the desired vacuum generation. Another benefit of the pressure relief function is to allow air to exit the tank at high flow rates during tank refueling. This function is commonly known as Onboard Refueling Vapor Recovery (ORVR).

A conventional Natural Vacuum Leak Detector (NVLD) employs a solenoid coil to move the pressure relief valve into a fully open position in order to minimize purge flow restriction during engine on periods. During certain periods with the engine running, the solenoid is de-energized in order to allow a "Large Leak" test to run. During these periods, the NVLD armature and poppet can sometimes resonate and cause objectionable noise.

Thus, there is a need to provide an improved NVLD that eliminates poppet resonance.

SUMMARY OF THE INVENTION

An object of the invention is to fulfill the need referred to above. In accordance with the principles of the present invention, this objective is achieved by providing a pressure management apparatus including a housing defining a fluid communication passage between first and second fluid ports. A poppet is disposed in the housing and is movable between first and second positions. The first position prevents fluid communication between the first and second fluid ports and the second position permits fluid communication between the first and second fluid ports. The poppet includes a structure translatable along an axis relative to the housing. At least a portion of the structure includes a permanent magnet. A member is fixed with respect to the housing and is associated with the structure. At least a portion of the member is of ferrous material such that the magnet is attracted to the member so that at least a portion of the poppet frictionally engages the member to create a dashpot damping of resonance of the poppet in the second position.

In accordance with another aspect of the invention a poppet assembly is provided for a pressure management apparatus for a vehicle. The poppet assembly includes a poppet defining an armature that is constructed and arranged to move between first and second positions. At least a portion of the poppet includes a permanent magnet. A stator member is associated with the poppet. At least a portion of the stator member is of ferrous material such that the magnet is attracted to stator member so that at least a portion of the poppet frictionally engages the stator member to create a dashpot damping of resonance of the poppet.

In accordance with another aspect of the invention, a method is provided for damping resonance of a poppet of a pressure management apparatus for a vehicle. The method providing a poppet defining an armature that is constructed and arranged to move between first and second positions in a housing of the pressure management apparatus. At least a portion of the poppet includes a permanent magnet. A stator member is associated with the poppet. At least a portion of the stator member is of ferrous material. Damping of resonance of the poppet occurs since the magnet is attracted to the stator member with at least a portion of the poppet frictionally engaging the stator member.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, in which.

DETAILED DESCRIPTION OF THE EXEMPLARY EMBODIMENT

Figure 1:
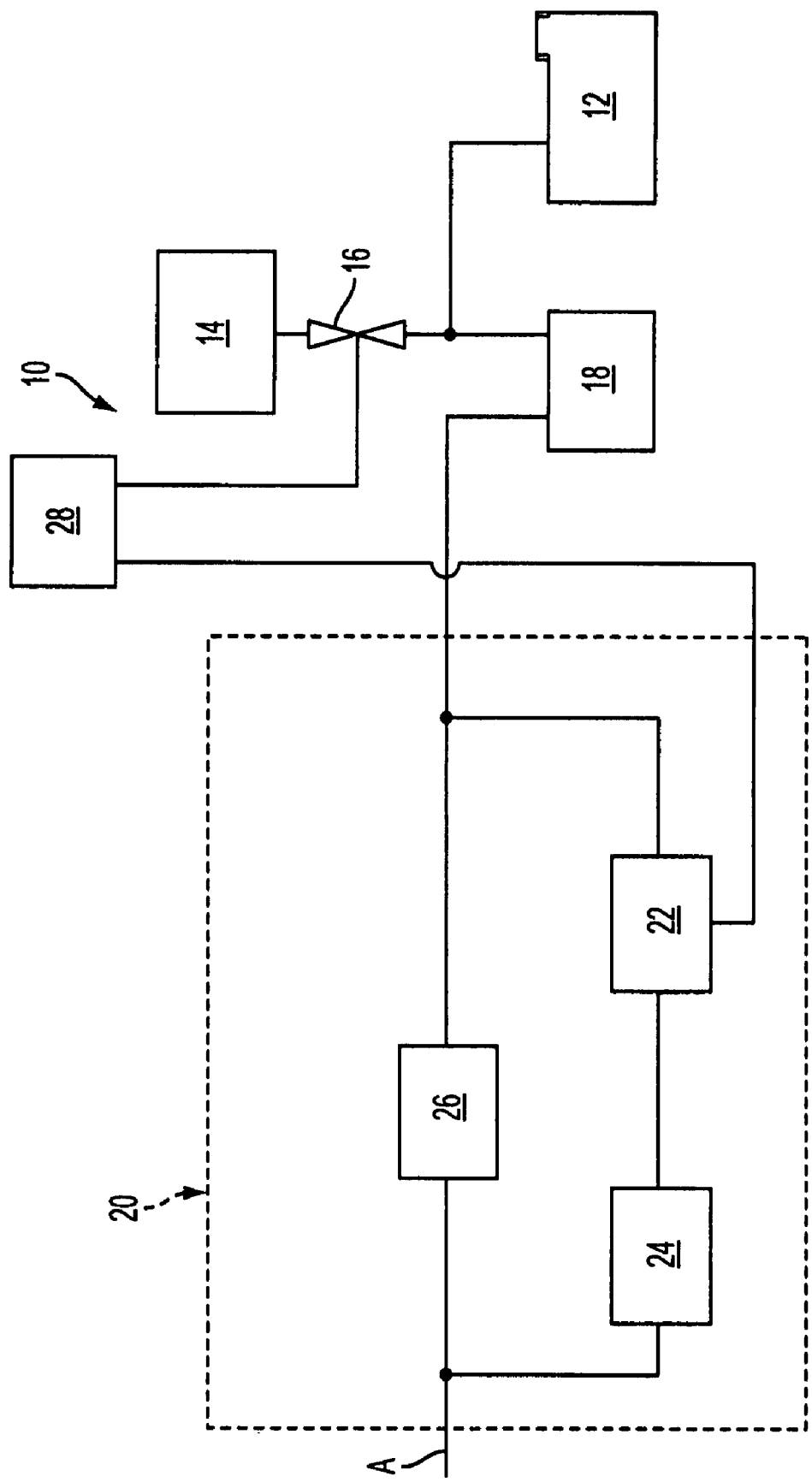
FIG. 1 is a schematic illustration showing a fuel system including a NVLD according to an embodiment of the present invention.

Referring to FIG. 1, a fuel system 10, e.g., for an engine (not shown), includes a fuel tank 12, a vacuum source 14 such as an intake manifold of the engine, a purge valve 16, a charcoal canister 18, and a pressure management apparatus, herein called a Natural Vacuum Leak Detector (NVLD) 20.

The NVLD 20 performs a plurality of functions including signaling 22 that a first predetermined pressure (vacuum)

level exists in the headspace of the fuel system 10, relieving pressure 24 (also referred to as relieving excess vacuum) in the headspace of the fuel system 10 at a value below the first predetermined pressure level, and relieving pressure 26 (also referred to as pressure blow-off) in the headspace of the fuel system 10 above a second pressure level. Relieving pressure 24, 26 refers to the relieving pressure in the fuel vapor collection canister 18 and throughout the headspace of the fuel system 10 relative to the ambient atmospheric pressure A.

In the course of cooling that is experienced by the fuel system 10, e.g., after the engine is turned off, a vacuum is created in the fuel vapor collection canister 18. The existence of a vacuum at the first predetermined pressure level indicates that the integrity of the fuel system 10 is satisfactory. Thus, signaling 22 is used for indicating the integrity of the fuel system 10, i.e., that there are no appreciable leaks. Subsequently relieving pressure 24 at a pressure level below the first predetermined pressure level protects the integrity of the fuel tank 12, i.e., prevents it from collapsing due to vacuum in the fuel system 10.

Immediately after the engine is turned off, relieving pressure 26 allows excess pressure due to fuel vaporization to blow off, thereby facilitating the desired vacuum generation that occurs during cooling. During pressure blow-off, air within the fuel system 10 is released while fuel molecules are retained in the fuel vapor collection canister 18. Similarly, in the course of refueling the fuel tank 12, relieving pressure 26 allows air to exit the fuel tank 12 at high flow.

While the engine is turned on, controllably connecting 28 the fuel vapor collection canister 18 to the ambient air A allows confirmation of the purge flow and allows confirmation of the signaling 22 performance. While the engine is turned off, controllably connecting 28 allows a computer for the engine to monitor the vacuum generated during cooling.

Figure 2:
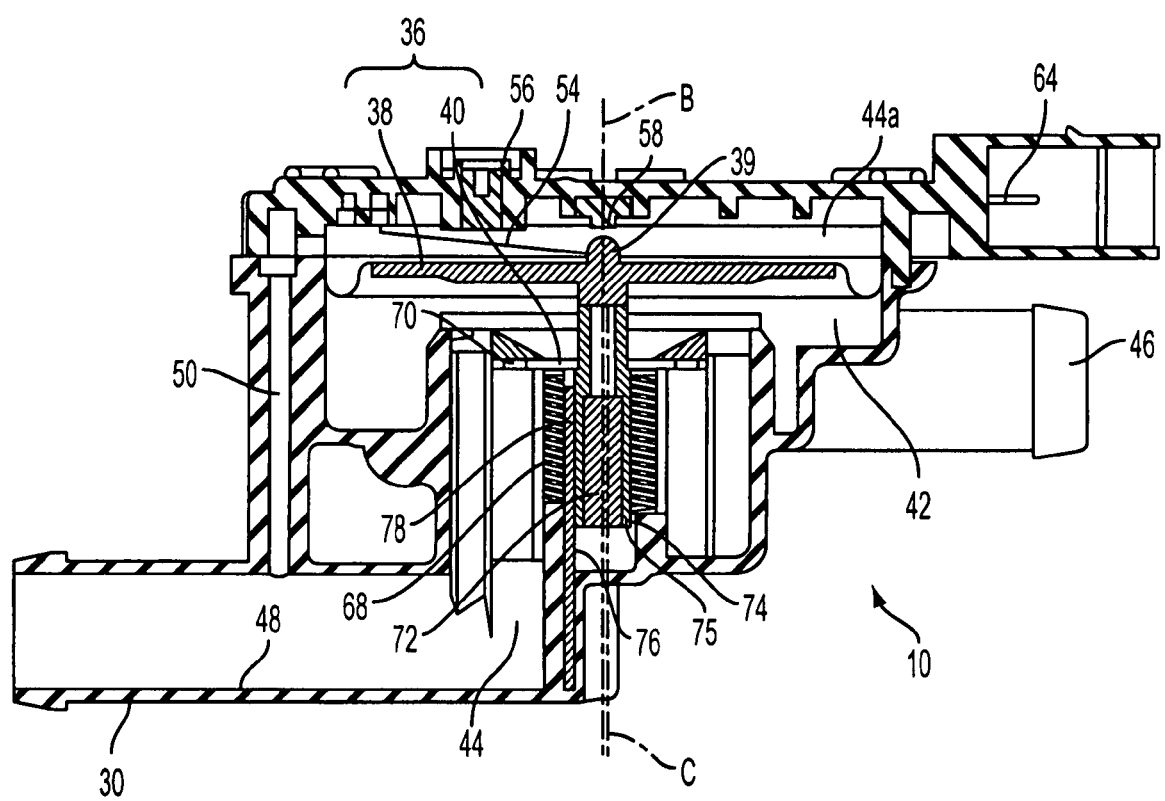
FIG. 2 is a sectional view of a NVLD provided in accordance with an embodiment of the present invention.

FIG. 2 shows an embodiment of the NVLD 20 constructed and arranged to be associated with the charcoal canister 18. The NVLD 20 includes a housing 30 that can be connected to the body of the charcoal canister 18. The NVLD 10 provides a simplified configuration and eliminates poppet resonance by using a magnetic armature as will be described below.

Signaling 22 occurs when vacuum at the first predetermined pressure level is present in the charcoal canister 18. A pressure operable device 36 separates an interior chamber in the housing 30. The pressure operable device 36, which includes a diaphragm 38 that is operatively interconnected to a poppet or valve 40, separates the interior chamber of the housing 30 into a first portion 42 and a second portion 44. The first portion 42 is in fluid communication with the ambient atmospheric pressure through a first port 46. The second portion 44 is in fluid communication with a second port 48 between housing 30 the charcoal canister 18. The second portion 44 is also in fluid communication with a separate portion 44a via signal passageway 50.

The force created as a result of vacuum in the separate portion 44a causes the diaphragm 38 to be displaced upwardly in FIG. 2. This displacement is opposed by a resilient element 54, e.g., a leaf spring. The bias of the resilient element 54 can be adjusted by a calibrating screw 56 such that a desired level of vacuum, e.g., one inch of water, will depress a switch 58 which is electrically connected to an outlet terminal 64. As vacuum is released, i.e., the pressure in the portions 44, 44a rises, the resilient element 54 pushes the diaphragm 38 away from the switch 58, whereby the switch 58 resets.

Pressure relieving 24 occurs as vacuum in the portions 44, 44a increases, i.e., the pressure decreases below the calibration level for actuating the switch 58. Vacuum in the charcoal canister 18 and the second portion 44 will continually act on the valve 40 inasmuch as the first portion 42 is always at or near the ambient atmospheric pressure A. At some value of vacuum below the first predetermined level, e.g., three inches of water, this vacuum will overcome the opposing force of a second resilient element 68 and displace the valve 40 away from a lip seal 70. This displacement will open the valve 40 from its closed position, thus allowing ambient air to be drawn through the first portion 42 into the second portion 44. That is to say, in an open position of the valve 40, the first and second ports 46, 48 are in fluid communication. In this way, vacuum in the fuel system 10 can be regulated.

According to a preferred embodiment of the present invention, the valve 40 is formed of injection molded plastic and is normally biased toward lip seal 70 due to the force of the second resilient element 68. To minimize resonance of the valve 40, particularly during pressure relieving 24, a damping movement effect is provided. The valve 40, defining an armature, includes magnet material, imbedded within a tubular portion 75, defining a permanent magnet 72. A typical material for the permanent magnet is Alnico, but any material that retains a magnetic field can be used.

The dashpot effect (damping) is created via friction between an outer surface 74 of a tubular portion 75 of the valve 40 containing the magnet 72 and an inner surface 76 of a restraining tube 78 fixed to the housing 30. To control the force against the inner surface 76 of the restraining tube 78, roughly one-half of the restraining tube 78 is formed out of ferrous metal. The ferrous portion of the restraining tube 78 is defined as a stator. It is noted that the armature (valve 40) is always attracted to the stator and is therefore it is pulled off-center within the restraining tube 78. To compensate for this effect, the axis C of the restraining tube 78 and thus the stator is located off-center (from vertical axis B) an equal distance in the opposite direction. The friction force dampens the motion of the valve 40 which has the effect of stopping resonance during the pressure relieving 24, 26.

Relieving pressure 26 is provided when there is a positive pressure in the second portion 44, e.g., when the tank 12 is being refueled. Specifically, the valve 40 is displaced to its open position to provide a very low restriction path for escaping air from the tank 12. When the charcoal canister 18, and hence the second portion 44, experience positive pressure above ambient atmospheric pressure, the signal passageway 50 communicates this positive pressure to the separate portion 44a. In turn, this positive pressure displaces the diaphragm 38 downward toward the valve 40. A diaphragm pin 39 transfers the displacement of the diaphragm 38 to the valve 40, thereby displacing the valve 40 to its open position with respect to the lip seal 70. Thus, pressure in the charcoal canister 18 due to refueling is allowed to escape through the lower portion 44, past the lip seal 70, through the first portion 42, and through the second port 46.

Relieving pressure 26 is also useful for regulating the pressure in fuel tank 12 during any situation in which the engine is turned off. By limiting the amount of positive pressure in the fuel tank 12, the cool-down vacuum effect will take place sooner.

The illustrated embodiment has many advantages including:

1. Friction is used as a damping or dashpot to eliminate poppet resonance.
2. Friction force is created by magnetic attraction between the stator and magnet 72.
3. The magnet 72 is insert molded or pressed into the tubular portion of the valve 40 to avoid a leakage path.

4. The permanent magnet 72 should be magnetized in a diametric fashion to maximize friction force.

5. The magnet 72 will automatically align one pole face to the stator. This is important for the friction force to be consistent.

6. The restraining tube 78 is formed off-center so as to establish the valve 40 on center with the remainder of the component.

7. Calculations have determined that the stator should ideally be an arc of length approximately 130 degrees for maximum magnetic force, but any angle up to 180 degrees has been found to be acceptable. Using a stator angle of 130 degrees will allow the use of the smallest, lightest magnet 72.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A pressure management apparatus comprising:
    a housing defining a fluid communication passage between first and second fluid ports,
    a poppet disposed in the housing and being movable between first and second positions, the first position preventing fluid communication between the first and second fluid ports, and the second position permitting fluid communication between the first and second fluid ports, the poppet including a structure translatable along an axis relative to the housing, at least a portion of the structure including a permanent magnet, and
    a member fixed with respect to the housing and associated with the structure, at least a portion of the member being of ferrous material such that the magnet is attracted to the member so that at least a portion of the poppet frictionally engages the member to create a dashpot damping of resonance of the poppet in the second position.

2. The apparatus of claim 1, wherein the structure is a tubular member, magnetic material being embedded within a portion of the tubular member thereby defining the permanent magnet.

3. The apparatus of claim 2, wherein the magnetic material is Alnico.

4. The apparatus of claim 2, wherein the tubular member is molded from plastic.

5. The apparatus of claim 2, wherein the member is in the form of a partial tube, an outside surface of the tubular member engaging an inside surface of the partial tube.

6. The apparatus of claim 5, wherein the partial tube is of an arc shape having an arc length less than 180 degrees.

7. The apparatus of claim 6, wherein the arc length is approximately 130 degrees.

8. The apparatus of claim 5, wherein the partial tube has an axis that is off-set from a vertical axis so as to compensate for skewing of the structure due to attraction to the magnet.

9. The apparatus of claim 5, wherein approximately one-half of the partial tube is of ferrous material.

10. A poppet assembly for a pressure management apparatus for a vehicle, the poppet assembly comprising:
    a poppet defining an armature that is constructed and arranged to move between first and second positions, at least a portion of the poppet including a permanent magnet, and
    a stator member associated with the poppet, at least a portion of the stator member being of ferrous material such that the magnet is attracted to stator member so that at least a portion of the poppet frictionally engages the stator member to create a dashpot damping of resonance of the poppet.

11. The assembly of claim 10, wherein the poppet includes a tubular member, magnetic material being embedded within a portion of the tubular member thereby defining the permanent magnet.

12. The assembly of claim 11, wherein the tubular member is molded from plastic.

13. The assembly of claim 11, wherein the stator member is in the form of a partial tube, an outside surface of the tubular member engaging an inside surface of the partial tube.

14. The assembly of claim 13, wherein the partial tube is of an arc shape having an arc length less than 180 degrees.

15. The assembly of claim 14, wherein the arc length is approximately 130 degrees.

16. The assembly of claim 13, wherein the partial tube has an axis that is off-set from a vertical axis so as to compensate for skewing of the structure due to attraction to the magnet.

17. The assembly of claim 13, wherein approximately one-half of the partial tube is of ferrous material.

18. A method of damping resonance of a poppet of a pressure management apparatus for a vehicle, the method comprising:
    providing a poppet defining an armature that is constructed and arranged to move between first and second positions in a housing of the pressure management apparatus, at least a portion of the poppet including a permanent magnet,
    providing a stator member associated with the poppet and fixed with respect to the housing, at least a portion of the stator member being of ferrous material, and
    damping of resonance of the poppet by ensuring that the magnet is attracted to the stator member so that at least a portion of the poppet frictionally engages the stator member.

19. The method of claim 18, wherein step of providing the poppet includes providing a tubular member and embedding magnetic material within a portion of the tubular member thereby defining the permanent magnet, and the step of providing the stator member includes providing a partial tube, the damping step including engaging an outside surface of the tubular member with an inside surface of the partial tube.

20. The method of claim 18, wherein the partial tube is of an arc shape having an arc length less than 180 degrees.

* * * * *